United States Patent [19]

Beyhurst et al.

[11] 4,185,174
[45] Jan. 22, 1980

[54] METHOD AND APPARATUS FOR CHECKING CONNECTION PATHS IN A TELEPHONE EXCHANGE

[75] Inventors: Désiré Beyhurst, Geispolsheim; Jean-Jacques Bronner, Bischoffsheim; Jean-Claude Fuhrer, Lipsheim; Henri Kraess, Strasbourg, all of France

[73] Assignee: La Telephone Industrielle et Commerciale-Telic, Strasbourg, France

[21] Appl. No.: 917,225

[22] Filed: Jun. 20, 1978

[30] Foreign Application Priority Data

Jun. 30, 1977 [FR] France ............................... 77 20077

[51] Int. Cl.² ............................................ H04M 3/24
[52] U.S. Cl. ........................ 179/175.2 R; 179/175.23
[58] Field of Search ......... 179/175, 175.2 R, 175.2 C, 179/175.21, 175.23

[56] References Cited

U.S. PATENT DOCUMENTS

| | | | |
|---|---|---|---|
| 3,937,908 | 2/1976 | Funk et al. | 179/175.23 |
| 4,024,359 | 5/1977 | DeMarco et al. | 179/175.2 R X |

Primary Examiner—Thomas A. Robinson
Attorney, Agent, or Firm—Sughrue, Rothwell, Mion, Zinn and Macpeak

[57] ABSTRACT

Apparatus for checking electrical connections switched through an automatic switching machine. Idle circuits (P1, Pn) e.g. subscriber lines and outside lines, are connected in turn through the switching machine to the terminating set (Tr) thereof. Tone is applied via the normal tone-feed circuits (GT C1 to Cn, TL1 to TLn) to the idle line and the tone is detected at the terminating set. All lines at the terminating set are scanned (Y1 to Yn) in turn to check for any possible cross-connection and then the next idle circuit is tested. The apparatus forms an integral part of the switching machine.

8 Claims, 4 Drawing Figures

METHOD AND APPARATUS FOR CHECKING CONNECTION PATHS IN A TELEPHONE EXCHANGE

The invention relates to the checking of the circuits for interconnecting subscriber lines and outside lines in an automatic telephone exchange in order to verify the state of a connection, and to make sure that the connection has good continuity and good isolation. Preferably the invention relates to an arrangement which also determines whether a connection is open circuit or whether it is short circuit with possible resulting cross-connection of a plurality of subscriber lines. The invention is intended principally for cyclic testing or routining of test connections set up over idle circuits of the exchange. Such testing may be performed on a continuous basis or during specific test periods.

In known exchanges, subscriber circuits are usually tested during maintenance by means of test devices which are external to the switching machine proper, e.g. by routiners or from test desks.

Preferred embodiments of the present invention provide for the testing of the interconnection circuits of a telephone exchange by means of a checking circuit which is integrated in the switching machine of the exchange.

The present invention provides a checking apparatus for testing the state of electrical continuity of a connection chain in a telephone exchange, the apparatus being integrated in the switching machine of the exchange and being arranged to perform checks continuously on connections by applying an alternating signal to one end of the connection and picking up this signal at a measuring circuit placed at the end of the connection, the apparatus including a tone-feed circuit which is constituted by the tone circuits of the switching machine situated at the subscriber line and outside line equipments thereof, and in that each tested connection chain comprises a tone generator, at least one interrupter switch for giving a cadence to a tone in normal telephone operation, a coupling transformer connected to at least one primary switching matrix, a matrix crosspoint feed transformer, and the measuring circuit which is connected to a secondary winding of the feed transformer.

The invention also provides a method of checking the state of electrical continuity of a connection chain in an automatic telephone exchange; the method comprising using the tone-feed circuits of the exchange for applying test signals to one end of a connection chain under test in picking up these signals at the other end of the chain and in comparing the levels of the picked up signals with reference levels.

Embodiments of the invention are described by way of example with reference to the accompanying drawings, in which.

Figure 1:
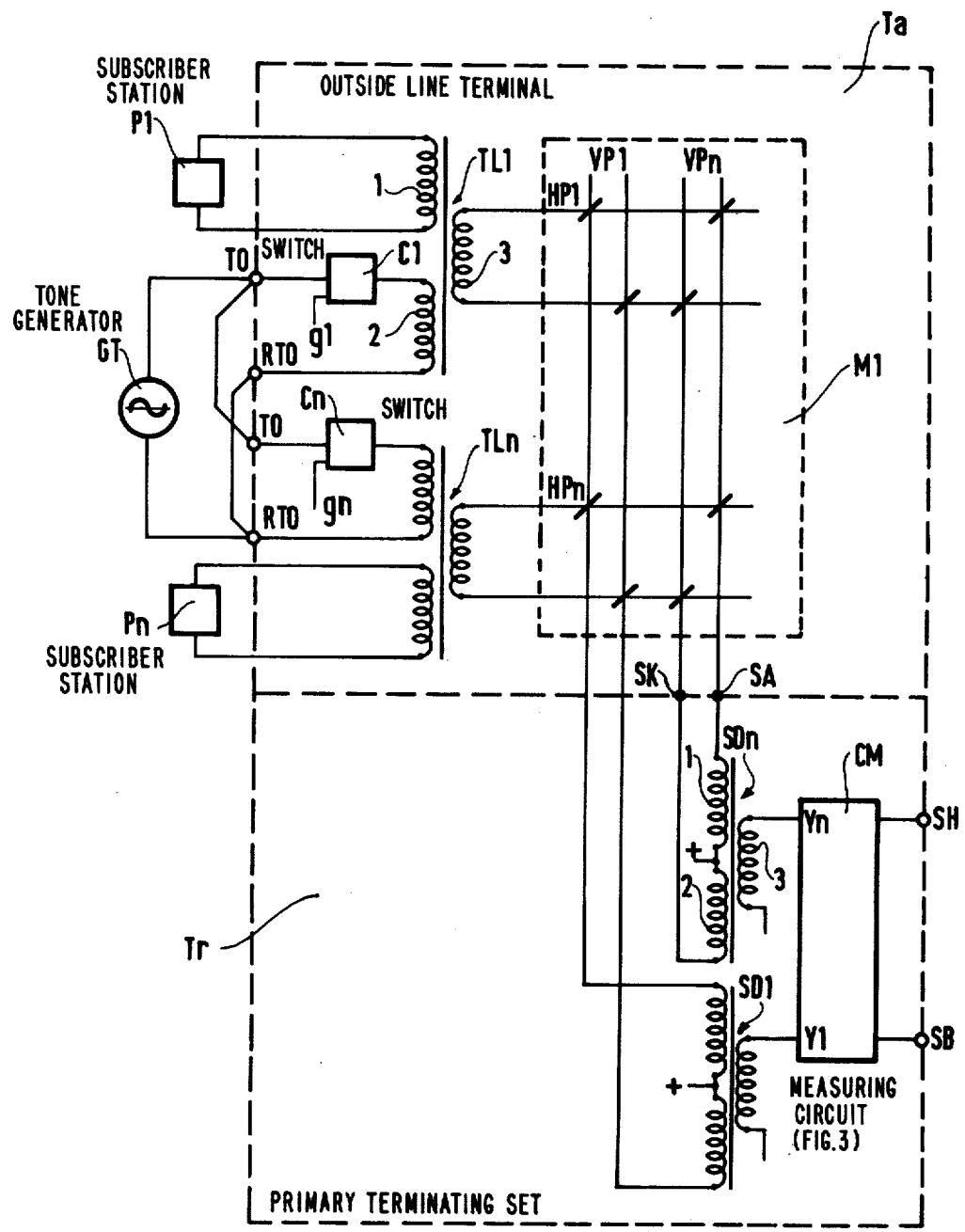
FIG. 1 is a circuit diagram of a checking apparatus for a one-stage connection.

FIG. 1 shows the tone-feed circuit which is used to generate the various tones which are applied to a telephone line by an automatic telephone exchange. It includes a 575 Hz tone generator Gt connected to terminals T0 and RT0 of a subscriber line or an outside line terminal Ta, and switches C1 to Cn, e.g. CMOS switches. Each of the switches C1 to Cn has a control input g1 to gn which receives periodic data from the exchange processor for interrupting the tone. When tone current is allowed to flow it is applied to coupling transformers TL1 to TLn. These transformers have three windings:

a first winding 1 connected to a subscriber station P1 to Pn;

a second winding 2 connected to the terminals T0 and RT0 via one of the switches C1 to Cn; and a third winding 3 connected to two horizontals of a primary switching matrix M1 which includes horizontals Hp1 to Hpn and verticals Vp1 to Vpn.

The tone-feed circuit is associated with a primary terminating set Tr constituted, for example, by the terminating board of the switching machine. The terminating set Tr includes three-winding transformers SD1 to SDn whose first and second windings 1 and 2 have a common point connected to positive battery with their opposite ends being connected to terminals SA and SK, themselves connected to respective verticals of the matrix M1.

Figure 3:
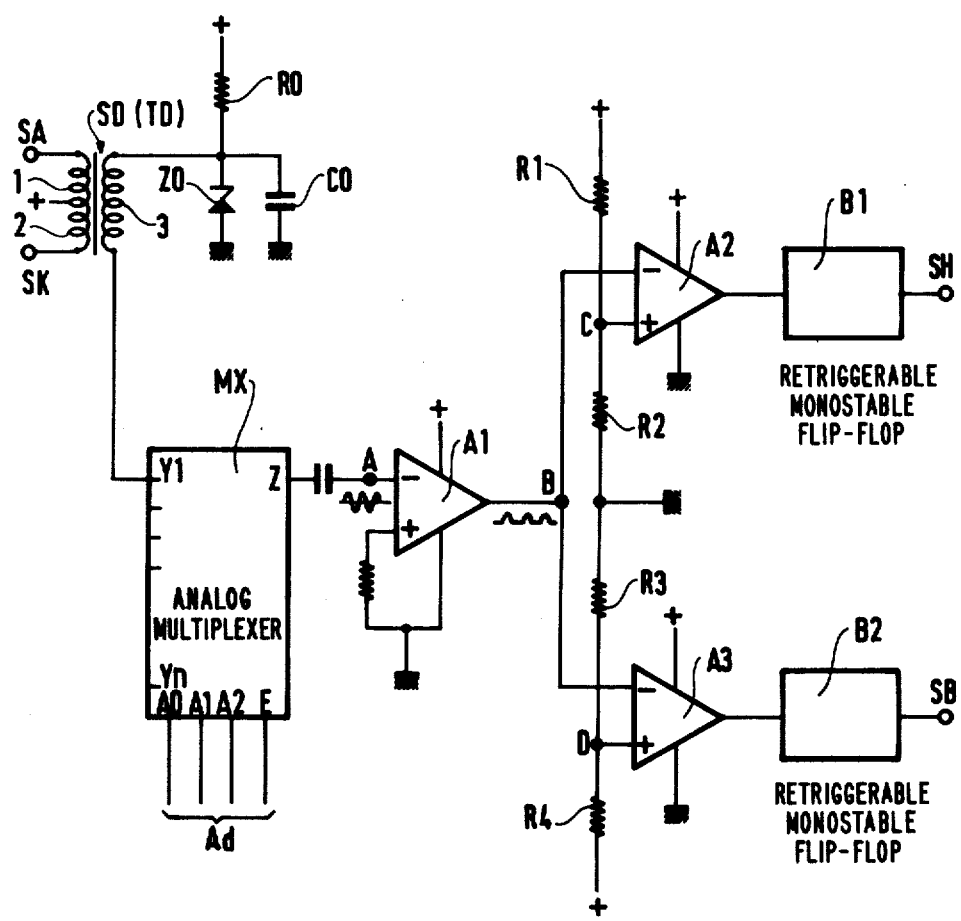
FIG. 3 is a circuit diagram of a measuring circuit.

The third windings 3 of the transformers SD1 to SDn are connected to a measuring circuit CM via inlets Y1 to Yn of the said measuring circuit selected by a multiplexer MX (see FIG. 3). The measuring circuit has a high threshold output SH and a low threshold output SB as will be seen with reference to FIG. 3.

Figure 2:
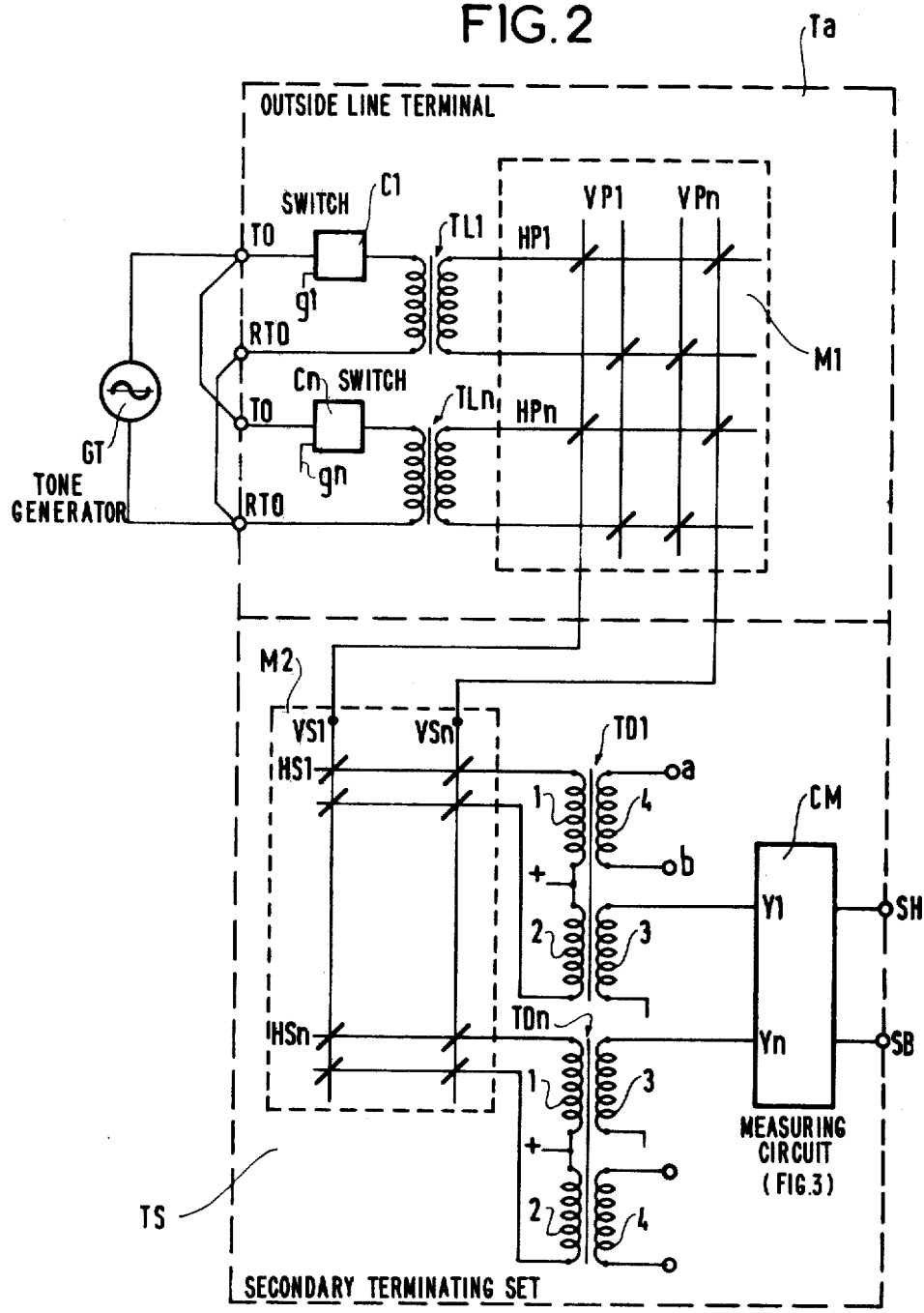
FIG. 2 is a circuit diagram of a checking apparatus in a two-stage connection.

FIG. 2 is a diagram similar to that of FIG. 1, but in this case it relates to a two-stage connection. The tone circuit GT, C1 to Cn, TL1 to TLn are connected to the horizontals HP1 to HPn of a primary matrix M1 whose verticals VP1 to VPn are connected to the verticals VS1 to VSn of a secondary matrix M2 of a secondary terminating set TS. The horizontals SH1 to SHn of the matrix M2 are connected to the first and second windings 1 and 2 of the transformer TD1 to TDn which feed them via the common points connected to the positive battery. The third windings 3 of the these transformers are connected to the inlets Y1 to Yn of the measuring circuit CM. These transformers TD, while including the same windings as the transformers SD, further include a fourth winding 4 connected to the speech pair ab.

FIG. 3 is a circuit diagram of the measuring circuit CM. The third winding 3 of a transformer SD (TD) of the terminating set Tr of FIG. 1 or of FIG. 2 has one end connected to an intermediate bias potential by a potential divider comprising a resistor R0, a Zener diode Z0 and a capacitor C0, and its other end connected to one inlet Y1 of the measuring circuit which includes n inlets Y1 to Yn which are constituted by the inlets of an analogue multiplexer MX which also includes addressing inlets A0, A1, A2 and E connected to the exchange processor. The outlet Z of the multiplexer MX is connected to one input of an operational amplifier A1 whose output is connected to a point B which is connected to the first inputs of two comparators A2 and A3.

The comparators A2 and A3 have respective second inputs connected to points C and D at intermediate potentials between the positive and negative potentials of the battery. The potentials of the points C and D are fixed by a chain of resistors R1, R2, R3 and R4 with the point C defining the high threshold and the point D the low threshold.

Figure 4:
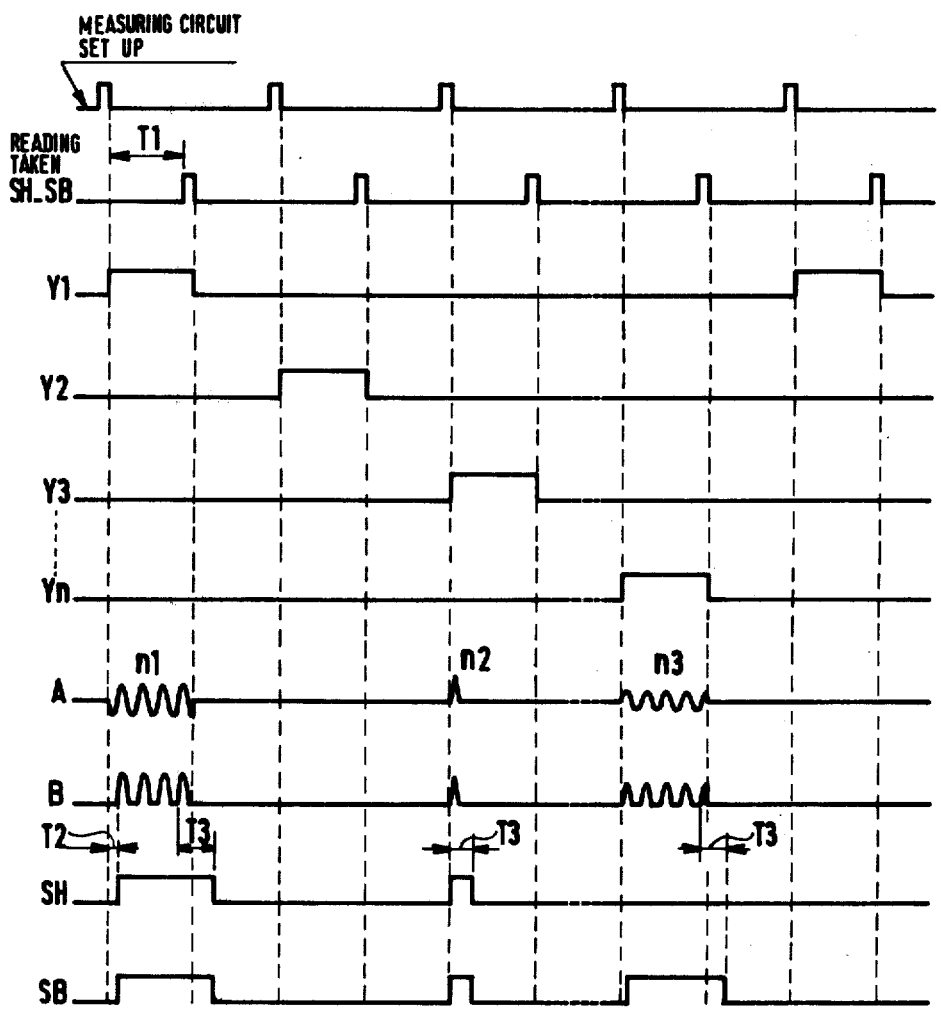
FIG. 4 is a waveform diagram for the circuit of FIG. 3.

The output of the comparator A2 is applied to a retriggerable monostable flip-flop B1 whose output is the output SH, and likewise the output of the comparator A3 is applied to a retriggerable monostable flip-flop B2 whose output is the output SB. The flip-flops B1 and B2 are constituted by monostables having a period T3 so chosen as to maintain the triggered position throughout the period of application of the current which sets up the measuring circuit. The waveform diagram of the measuring circuit is given in FIG. 4 where the voltages at the points Y1 to Yn, A,B, SH and SB are shown.

Voltages $n_1$, $n_2$ and $n_3$ at the point A represent:

$n_1$ high level of a good connection;

$n_2$ short duration interference signal, not measured; and $n_3$ low-level (as in the case of a short circuit, and interference signal or cross-talk).

The outputs SH and SB are read at a time T1 after a connection to be measured has been set up in order to eliminate interference and transient effects which occur on switching current.

T2 shows the delay between the application of a signal to the inlet of the measuring circuit and the arrival of a signal at one of its outputs SH or SB.

T3 shows the delay caused by the monostable flip-flop B1 or B2. T1 is chosen to be greater than T3.

The low threshold SB is fixed as a function of the interference signals encountered on the lines of the switching machine.

The operation of the measuring circuit of FIG. 3 is as follows:

The measuring signal is picked up on a winding 3 of a transformer SD or TD and applied to one of the inlets Y1 to Yn of the multiplexer MX. The channel to be measured is selected by means of the address inputs of the multiplexer MX. The signal A (see FIG. 4) at the output of the multiplexer MX is initially amplified and rectified by the operational amplifier A1 (half-wave rectification at B, FIG. 4). The rectified current B is applied to the comparators A2 and A3. The comparator A2 delivers a logic level 1 signal when the peak level of the signal at B is greater than the reference level C (high threshold). The comparator A3 delivers a logic level 1 signal when the peak level at B is greater than the reference level D (low threshold). Each of the comparators A2 and A3 is followed by a retriggerable monostable flip-flop B1 or B2 to obtain a constant level at SH or SB once the corresponding threshold C or D has been exceeded. The operation is made clear by the waveforms of FIG. 4. The data collected at the outputs SH and SB is processed by the exchange processor.

The operation of a checking apparatus described above is as follows:

FIG. 1 case

The circuit through the switch C1 is closed, for example, and the tone generator GT injects a signal at a frequency of 575 Hz from the subscriber line or outside line to the terminating set Tr via the circuit T0, C1, HP1, VP1, SD1, and Y1.

The signal is picked up by the third winding 3 of the transformer SD1 which applies it to the input Y1 of the measuring circuit which delivers two output signals SH and SB at high and low levels respectively. If the connection is good, the signal picked at Y1 is good and the output SH of the measuring circuit will be at level 1. If, on the contrary, the connection is bad, the output SH will not give a signal; which may mean that the line is open-circuit or that the line is crossed. The measuring circuit successively checks the level of the signals on the transformers SD2 to SDn, i.e. the signal picked up on the inlets Y2 to Yn of the measuring circuit CM. If the measuring circuit supplies a low level signal SB=1, e.g. on the inlet Y3, this indicates a cross connection between circuit n° 1 and circuit n° 3. If SB=0 for all the inlets Y2 to Yn, and SH=0 this indicates that circuit n° 1 is open circuit. The procedure is repeated with the following line by establishing the following circuit through the switch C2:

T0, C2, HP2, VP1, VS1, HS2, TD2, Y2 and the signals picked up at the inlets Y2 to Yn and Y1 are checked as before.

The following lines are tested in an analogous manner. When the cycle is over a new cycle begins.

In the FIG. 2 case the apparatus operates in the same way except that the established connections are as follows:

T0, C1, HP1, VP1, VS1, HS1, T01, Y1 for the first line,

T0, C2, HP2, VP1, VS1, HS2, TD2, Y2 for the second line, and so on for the following lines.

The advantages of employing the apparatus in accordance with the invention are the folowing:

The device enables proper operation of the switching machine to be detected by detecting whether a connection circuit is faulty, in particular whether it is short-circuited or whether a cross-point is faulty. The testing of circuits is performed continuously or in accordance with the determined program on those circuits and lines which are free by means of a device which is integral with the switching machine, the circuits and lines which are engaged being skipped.

The measuring apparatus is common to a plurality of subscribers.

We claim:

1. Apparatus for testing the state of electrical continuity of a connection chain in a telephone exchange, the apparatus being integrated in the switching machine of the exchange and being arranged to perform checks continuously on connections by applying an alternating signal to one end of the connection and picking up this signal at a measuring circuit placed at the end of the connection, the apparatus including a tone-feed circuit which is constituted by the tone circuits of the switching machine situated at the subscriber line and outside line equipments thereof, each tested connection chain comprising a tone generator, at least one interrupter switch for giving a cadence to a tone in normal telephone operation, a coupling transformer connected to at least one primary switching matrix, a matrix crosspoint feed transformer, and the measuring circuit which is connected to a secondary winding of the feed transformer.

2. A device according to claim 1, wherein the measuring circuit includes a level comparator circuit which detects a high level signal by comparison with a first reference level and a low level signal by comparison with a second reference level.

3. A device according to claim 2, wherein the level comparison circuit includes two comparators connected to two delay monostable flip-flops, which indicate respectively the low and the high levels, the high level corresponding to a good state for the tested circuit, the low level corresponding to a fault in the tested circuit.

4. A device according to claim 3, wherein the monostable flip-flops are of the retriggerable type.

5. A device according to any previous claim, wherein the measuring circuit is provided on a board of the terminating set.

6. A method of checking the state of electrical continuity of a connection chain in an automatic telephone exchange; the method comprising using the tone-feed circuits of the exchange for applying test signals to one end of a connection chain, under test, picking up these signals at the other end of the chain and comparing the levels of the picked up signals with reference levels.

7. The method of checking connections according to claim 6, wherein a test signal is applied to one of a plurality of chains to be tested, this signal being picked up at the end of the chain and checked by a measuring circuit, which then checks successively the signal levels picked up on the other circuits in order to detect any possible cross-connection with the first circuit.

8. The method of checking connections according to claim 6 or 7, wherein the tests are performed successively on free circuits, with busy circuits being skipped.

* * * * *